United States Patent
Cooper et al.

(10) Patent No.: US 8,843,419 B2
(45) Date of Patent: Sep. 23, 2014

(54) METHOD AND SYSTEM FOR RAIL VEHICLE RECONFIGURATION

(75) Inventors: Jared Klineman Cooper, Palm Bay, FL (US); David Eldredge, Melbourne, FL (US); Robert Foy, Melbourne, FL (US); Glenn Shaffer, Erie, FL (US); John Brand, Melbourne, FL (US); Todd William Goodermuth, Melbourne, FL (US); Christopher Rekucki, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 661 days.

(21) Appl. No.: 12/902,209

(22) Filed: Oct. 12, 2010

(65) Prior Publication Data

US 2012/0089537 A1 Apr. 12, 2012

(51) Int. Cl.
- *G06Q 99/00* (2006.01)
- *G06F 17/00* (2006.01)
- *B61L 15/00* (2006.01)
- *G06Q 30/02* (2012.01)
- *B60L 15/32* (2006.01)
- *B61C 17/12* (2006.01)
- *H04L 29/08* (2006.01)

(52) U.S. Cl.
CPC .............. *B60L 15/32* (2013.01); *B61L 15/0063* (2013.01); *G06Q 30/0283* (2013.01); *B60L 2200/26* (2013.01); *B61L 15/0072* (2013.01); *B61C 17/12* (2013.01); *H04L 67/14* (2013.01); *Y02T 30/10* (2013.01)
USPC ........ 705/335; 705/330; 705/400; 246/167 R; 701/19

(58) Field of Classification Search
CPC ... B61L 27/0027; B61L 25/025; G06Q 10/00; G06Q 10/08

USPC .............. 705/400, 330, 335; 246/167 R, 167; 701/19–20, 2; 715/700
See application file for complete search history.

(56) References Cited

U.S. PATENT DOCUMENTS 7,206,676 B2 * 4/2007 Cross et al. ..................... 701/19
7,302,895 B2 12/2007 Kumar et al.

(Continued)

FOREIGN PATENT DOCUMENTS

| AU | 2009251095 A1 | 7/2010 |
| EP | 1552997 A2 | 7/2005 |

OTHER PUBLICATIONS

Leasing Locomotives in 2008: Be Prepared for a Bloodletting. (Railcar Leasing and Renting), Oct. 1, 2007, HighBeam Research, 4 pages.*

(Continued)

*Primary Examiner* — John Hayes
*Assistant Examiner* — Freda A Nelson
(74) *Attorney, Agent, or Firm* — GE Global Patent Operation; John A. Kramer (57) ABSTRACT

Methods and systems are provided for controlling a locomotive (or other rail vehicle) owned by a first entity when borrowed and operated by a second entity. The locomotive includes an operating control system having a first mode and a second, different mode of operation, the first mode including settings configured for the first entity, the second mode including settings configured for a second, different entity. The method includes enabling the first mode and disabling the second mode of the operating control system when the locomotive is operated by the first entity, and enabling the second mode and disabling the first mode of the operating control system when the locomotive is operated by the second entity.

5 Claims, 4 Drawing Sheets

(56) References Cited

U.S. PATENT DOCUMENTS

| | | | |
|---|---|---|---|
| 7,618,011 B2 * | 11/2009 | Oleski et al. | 246/167 R |
| 8,150,780 B2 * | 4/2012 | Brandt et al. | 705/330 |
| 2005/0120904 A1 | 6/2005 | Kumar et al. | |
| 2005/0143874 A1 * | 6/2005 | Peltz et al. | 701/19 |
| 2006/0138285 A1 * | 6/2006 | Oleski et al. | 246/167 R |
| 2009/0292411 A1 * | 11/2009 | Smith et al. | 701/19 |
| 2009/0299555 A1 * | 12/2009 | Houpt et al. | 701/19 |
| 2011/0118914 A1 * | 5/2011 | Brooks et al. | 701/20 |
| 2012/0173446 A1 * | 7/2012 | Brandt et al. | 705/330 |

OTHER PUBLICATIONS

Search Report and Written Opinion from corresponding PCT Application No. PCT/US2011/049034 dated Aug. 28, 2012.

* cited by examiner

METHOD AND SYSTEM FOR RAIL VEHICLE RECONFIGURATION

FIELD

Embodiments of the subject matter disclosed herein relate to a method and system for reconfiguring one or more rail vehicles of a train or other rail vehicle consist when power is shared.

BACKGROUND

Train consists may be configured with one or more locomotives and one or more cars. Various train lines are owned and operated by different railroad companies. Each railroad company uses a selected locomotive operating control system for controlling the locomotives of its fleet.

Due to the large volume of trains being operated, sometimes a railroad company may need to borrow a locomotive from another railroad company. However, if the two companies do not use the same locomotive operating control system, the borrowed locomotive becomes functionally incompatible (with respect to control system) with the other locomotives in the fleet of the borrowing company. Consequently, the incompatible locomotive is relegated to a remote locomotive status, even if it is newer than the other locomotives in the train consist. If the newer borrowed locomotive has novel features unavailable on the other locomotives of the train consist, the full advantages of the borrowed locomotive are not availed.

BRIEF DESCRIPTION OF THE INVENTION

Methods and systems are provided for reconfiguring the control system of a borrowed rail vehicle (e.g., locomotive) from the configuration used by its owning entity to the control system used by the borrowing entity. In one embodiment, the method comprises, receiving a control signal indicating that a first rail vehicle is intended for temporary use with a second rail vehicle, wherein the first rail vehicle is owned or controlled by a first entity and operates according to a first operating control system, and wherein the second rail vehicle is owned or controlled by a second, different entity and operates according to a second, different operating control system. The method further comprises, based on the received control signal, temporarily disabling the first operating control system on the first rail vehicle, and configuring the first rail vehicle for operation according to the second operating control system. The method also comprises, controlling the first rail vehicle with the second operating control system, and controlling the second rail vehicle with the second operating control system (e.g., the first rail vehicle may be controlled with the second operating control system for moving along a route in a different manner than if the first rail vehicle had been controlled with the first operating control system).

In one example, a locomotive controller determines a trip plan for a train including a plurality of locomotives based on mission details (scheduled route, scheduled stops, etc.) and train details (train configuration, train consists, etc.). Herein, the plurality of locomotives includes at least a first locomotive operated by a first entity (such as a first railroad company) that uses a first operating control system designed specifically for the first entity, and a second locomotive operated by a second, different entity (such as a second railroad company) that uses a second operating control system designed specifically for the second entity. The different control systems may include different modes of software. In one example, the first control system includes a first mode of a trip optimization software while the second control system includes a second mode of the trip optimization software. The trip optimization software is configured to determine locomotive settings, such as notch settings, injection timing settings, horsepower settings, brake settings, AESS settings, etc., for the given locomotive based on locomotive operating conditions and further based on the selected mode of the software. As such, in each mode, the trip optimization software includes mode-specific rules, limits, settings, and constraints based on the entity it services in that mode.

The locomotive controller determines whether the first locomotive owned by the first entity is intended to be temporarily used with the second locomotive owned by the second entity in a train consist. The controller further determines whether the (first) operating control system on the borrowed first locomotive is compatible with the (second) operating control system on the second, and remaining locomotives of the train consist.

If the first control system of the first locomotive is compatible with the second control system of the second locomotive, the first (borrowed) locomotive may be used in any configuration (that is, as lead or remote locomotive) in the train consist with the remaining locomotives. However, in the event that the first control system of the first locomotive is incompatible with the second control system of the second locomotive (and/or remaining locomotives on the train consist), the controller may reconfigure the first locomotive for operation according to the second operating control system, that is, compatibly with the second locomotive, and remaining locomotives in the train consist. Specifically, the controller may temporarily disable the (original) first operating control system on the borrowed first locomotive (e.g., for at least the duration of train operation) while temporarily enabling the second control system on the first locomotive. The controller may then operate the first and second locomotives according to the second operating control system. The first locomotive can now be used as a lead or remote locomotive with the other locomotives in the train consist. In one example, where the first locomotive is used as a lead locomotive and the second locomotive is used as a remote locomotive, the second locomotive may be controlled with the first locomotive.

In one example, reconfiguration of the control system on the first locomotive is carried out wirelessly, for example, by wirelessly loading a software corresponding to the second control system of the second entity onto the first locomotive while temporarily disabling the original software corresponding to the first control system of the first entity. Alternatively, if the borrowed first locomotive is already pre-fitted with software corresponding to the operating control system with various modes and configurations corresponding to the different entities (such as a first mode corresponding to the first entity and a second mode corresponding to the second entity), the controller may switch modes on the software to enable the reconfiguration. Specifically, the reconfiguration may include changing the operating mode of the pre-fitted operating control system on the first locomotive from a first operating mode corresponding to the first entity to a second operating mode corresponding to the second entity (for example, from a first mode of a trip optimization software to a second mode thereof).

As such, the reconfiguration causes the operating rules, limits, constraints and settings of the first locomotive to be changed over from the selected settings and rules of the first (lending) entity to the selected settings and rules of the second (borrowing) entity. Reconfiguring the operating control system also includes reconfiguring an operator control interface, such as an interface visible to an operator on an on-board display. For example, when the operating control system on the first locomotive is switched from the first setting to the second setting, the operator interface displayed on the first locomotive is also switched from the first setting (corresponding to the lending entity) to a second setting (corresponding to the borrowing entity).

In this way, by reconfiguring a borrowed locomotive to operate according to the configurations of a borrowing entity (instead of the lending entity), the compatibility of the borrowed locomotive may be improved, allowing the borrowing entity to avail of all the advantages of the borrowed locomotive. In particular, where the borrowed locomotive is a newer locomotive equipped with new and recent features not available on the older locomotives of the borrowing entity, the reconfiguration allows the borrowed locomotive to be used as a lead locomotive and enables the various new and recent features (such as novel fuel economy, emission control, and performance enhancing features) of the borrowed locomotive to be advantageously used during train operation. In this way, train fuel economy and performance can be improved. Additionally, by operating all the locomotives of a train consist according to the same operating control system, and with the same settings on a locomotive display interface, fleet consistency is achieved.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
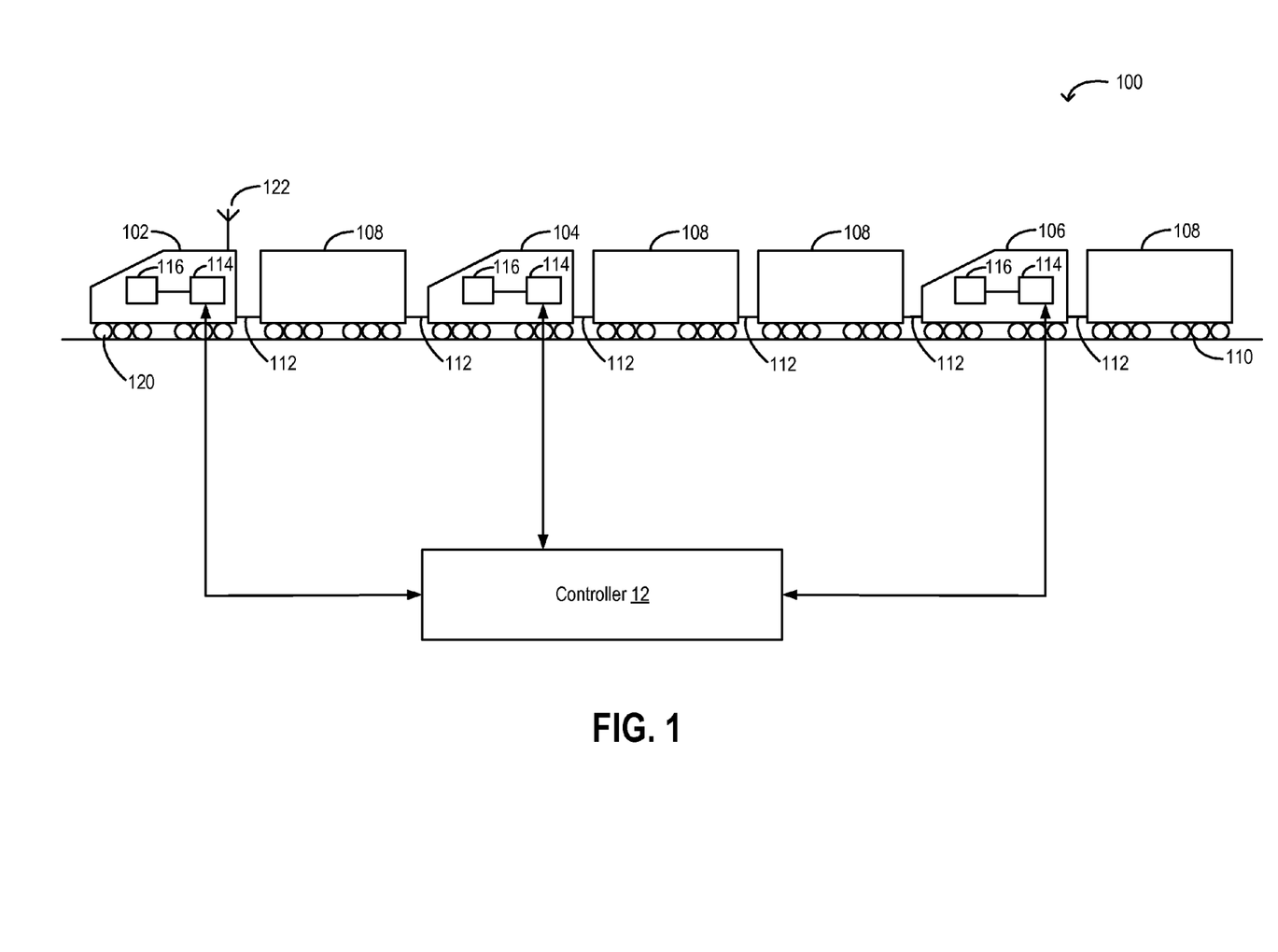
FIG. 1 shows an example embodiment of a train system with multiple locomotives and cars.
Figure 2:
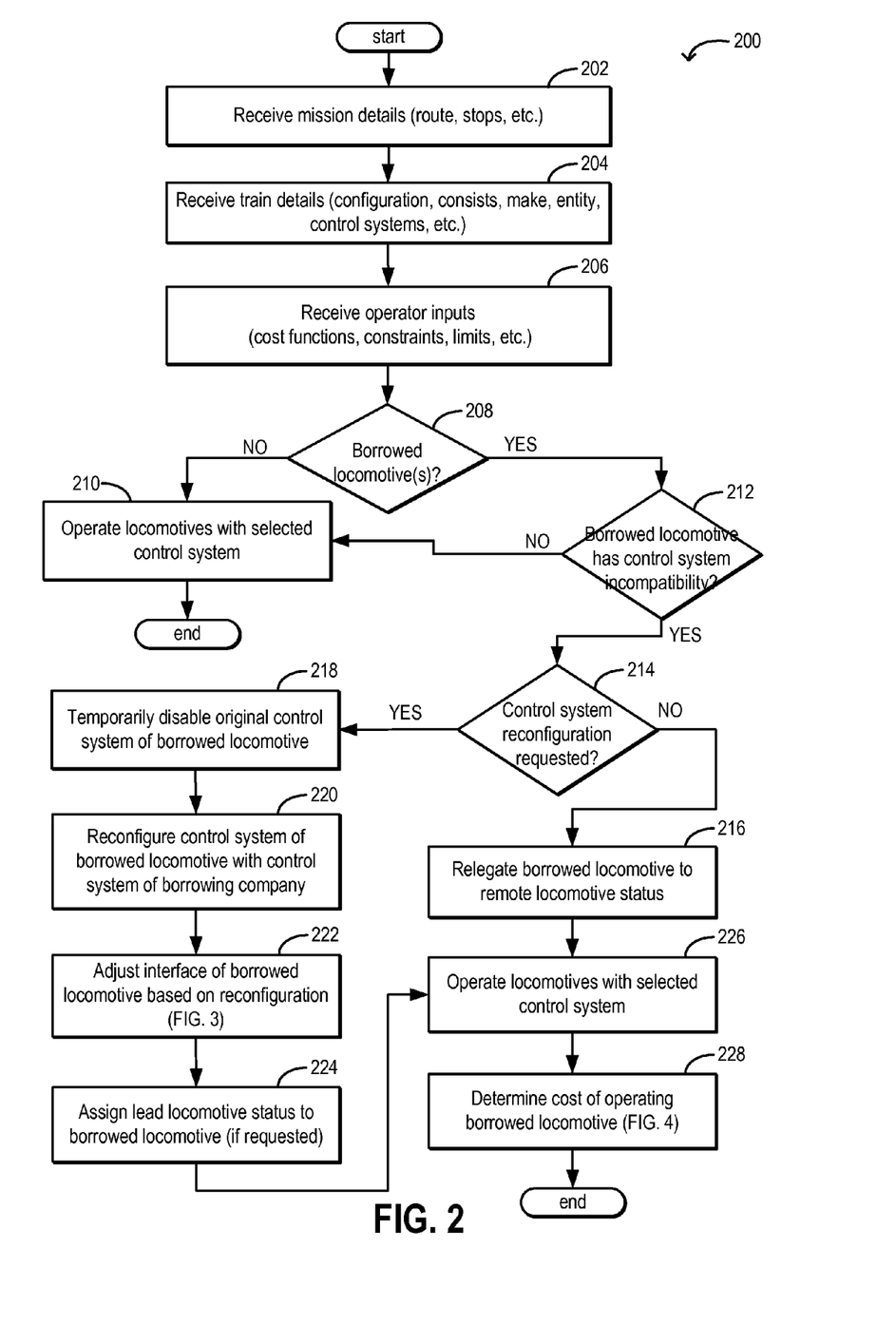
FIG. 2 shows a high level flow chart of a method for reconfiguring a locomotive operating control system according to the present disclosure.
Figure 3:
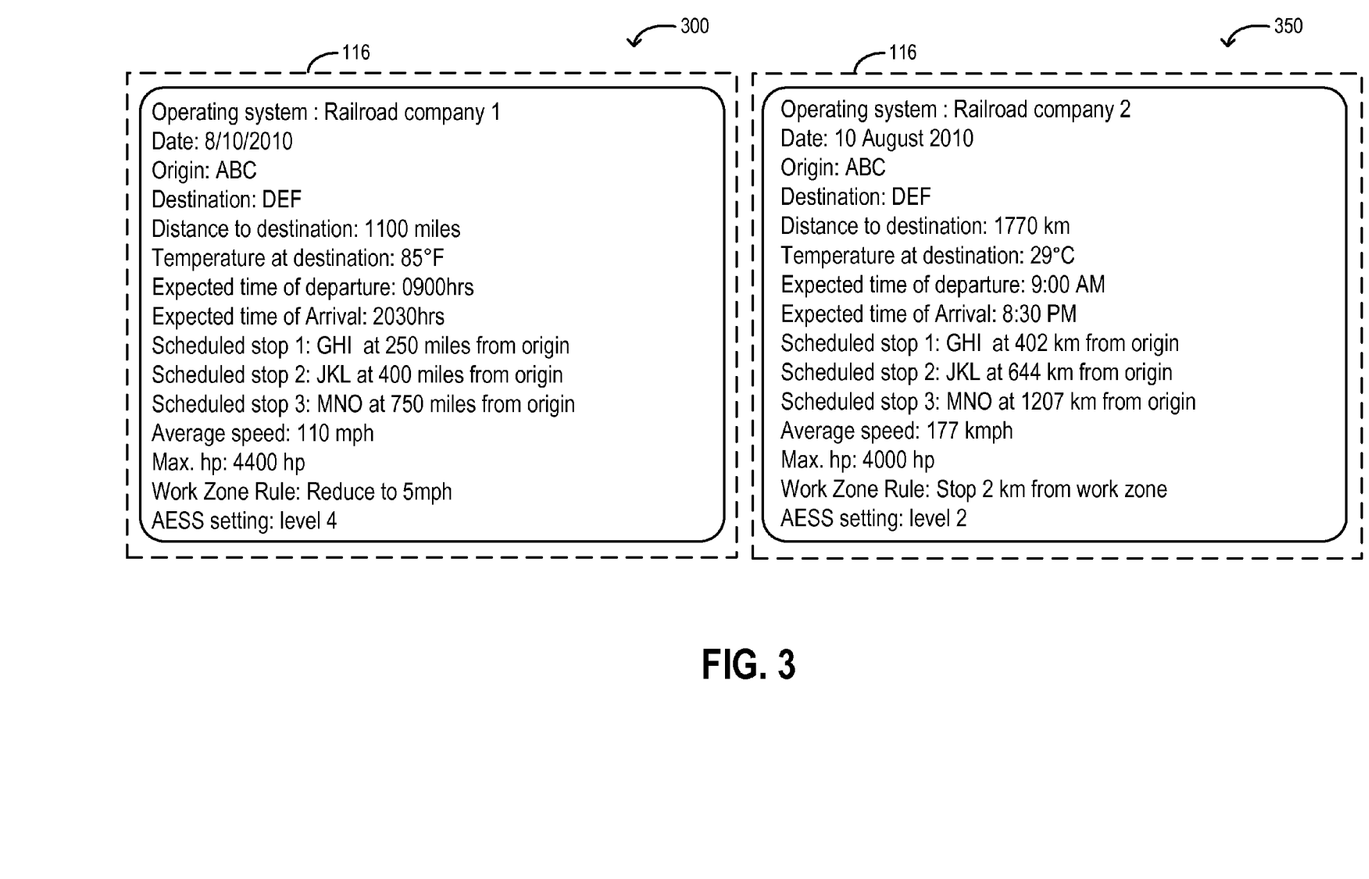
FIG. 3 shows an example change in interface in response to the locomotive operating control system reconfiguration of FIG. 2.
Figure 4:
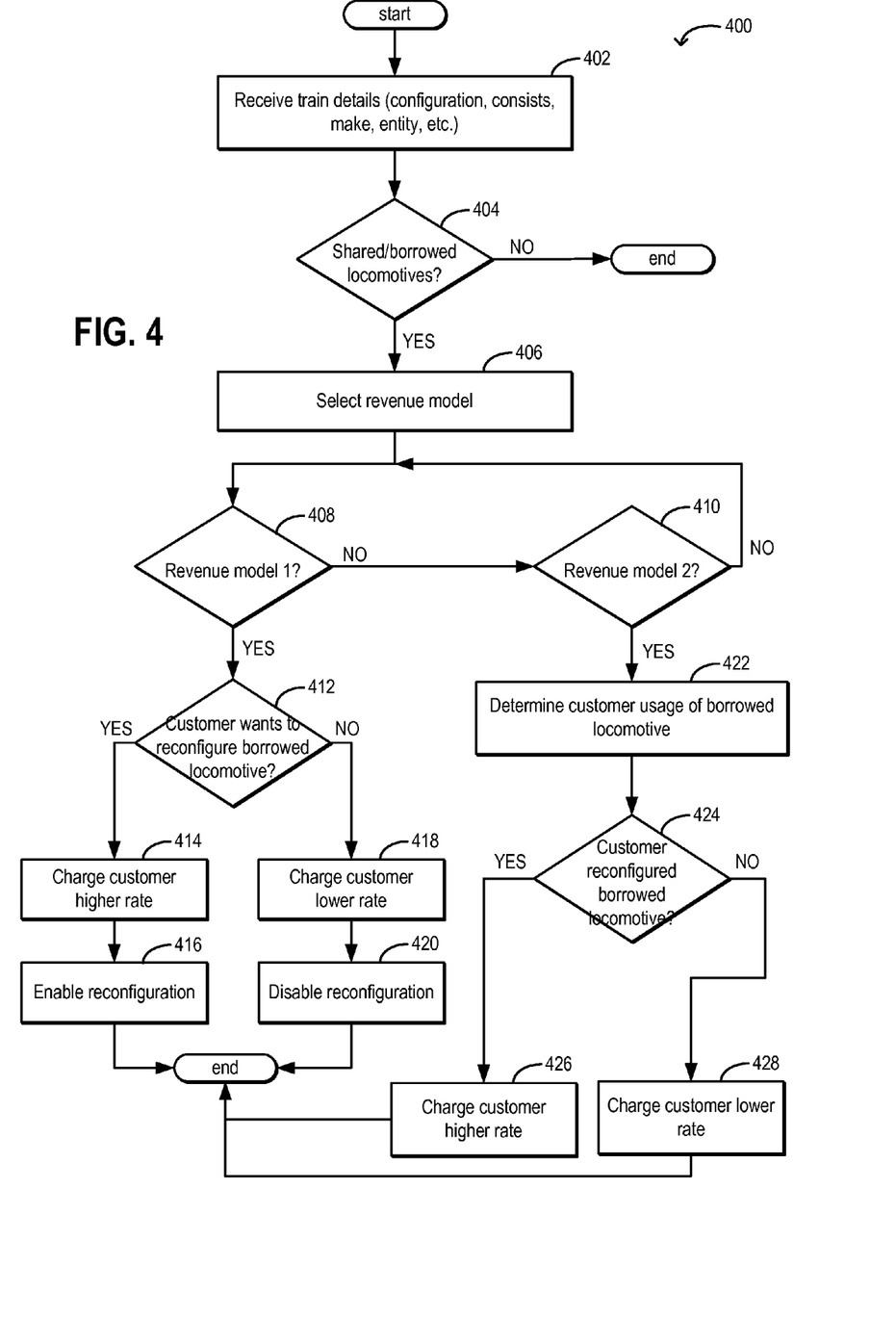
FIG. 4 shows a high level flow chart of a method for earning revenues based on the locomotive operating control system reconfiguration of FIG. 2.

Trains owned and operated by a first entity (e.g., a first railroad company or other business entity) may include one or more locomotives, or other rail vehicles, (as shown in FIG. 1) borrowed from a second entity (e.g., a second railroad company or other business entity). The different entities may use different operating control systems on the locomotives or other rail vehicles of their fleet, each operating control system designed with settings and configurations specific for the given entity. To improve the compatibility of a borrowed locomotive (or other rail vehicle), a locomotive controller can reconfigure the operating control system of the borrowed locomotive (or other rail vehicle) according to the operating control system of the borrowing company (that is, the first entity), while temporarily disabling some or all of the original settings (that is, for the second entity) of the borrowed locomotive, as shown in FIG. 2. The reconfiguration also includes correspondingly changing a locomotive interface visible to the train operator, as shown in FIG. 3. The locomotive controller can further assist in managing rail vehicle rentals by operating various revenue models, as shown in FIG. 4. For example, reconfiguration of the borrowed rail vehicle can be enabled upon payment of a fee, or the fee paid may be based upon the reconfiguration of the borrowed rail vehicle. By allowing a borrowed rail vehicle to be used according to the control system of the borrowing company, the borrowed rail vehicle can be used in a lead configuration and related advantages can be availed. Furthermore, fleet consistency is improved.

FIG. 1 illustrates an example train system 100, including a plurality of rail vehicles, herein depicted as locomotives 102, 104, 106, and a plurality of cars 108, configured to run on track 110. The plurality of locomotives 102, 104, 106 include a lead locomotive 102 and one or more remote locomotives 104, 106. While the depicted example shows three locomotives and four cars, any appropriate number of locomotives and cars can be included in train 100. It will also be appreciated that while the depicted example illustrates locomotives and train consists, this is not meant in a limiting sense, and that in alternate embodiments, any appropriate rail vehicle and/or rail vehicle consist can be used.

Locomotives 102, 104, 106 are powered for propulsion, while cars 108 are non-powered. In one example, locomotives 102, 104, 106 are diesel-electric locomotives powered by diesel engines. However, in alternate embodiments, the locomotive may be powered with an alternate engine configuration, such as a gasoline engine, a biodiesel engine, a natural gas engine, or wayside (e.g., catenary, or third-rail) electric, for example.

Locomotives 102, 104, 106 and cars 108 are coupled to each other through couplers 112. While the depicted example illustrates locomotives 102, 104, 106 connected to each other through interspersed cars 108, in alternate embodiments, one or more locomotives may be connected in succession, as a consist, while the one or more cars may be coupled to a remote locomotive in succession.

Locomotive controller 12 is configured to receive information from, and transmit signals to, each of the locomotives 102, 104, 106 of train system 100. Controller 12 receives inputs from various sensors of train system 100 and adjusts train and locomotive operating parameters accordingly. The various sensors may include, for example, coupler sensors, track grade sensors, temperature sensors, tractive effort sensors, etc. Locomotive parameters adjusted may include, for example, a locomotive notch setting, engine injection timing, power distribution between locomotives, speed limits, etc. Controller 12 can be situated in a remote location, such as at a dispatch center, or in a local environment, such as on-board the lead locomotive of train system 100.

The locomotive engine generates a torque that is used by a system alternator to generate electricity for subsequent propagation of the locomotive. Traction motors mounted on a truck below the locomotive provide tractive power for propulsion. In one example, as depicted herein, six inverter-traction motor pairs may be provided for each of six axle-wheel pairs 120 of each locomotive. The traction motors are also configured to act as generators providing dynamic braking to brake the locomotive. In particular, during dynamic braking, each traction motor provides torque in a direction that is opposite from the torque required to propel the locomotive in the rolling direction thereby generating electricity.

At least a portion of the generated electrical power can be routed to a system electrical energy storage device, such as a battery. Air brakes making use of compressed air may also be used by each locomotive for braking.

Locomotive operating crew and electronic components involved in locomotive systems control and management, such as an operating control system 114, are housed within a cab on each locomotive 102, 104, 106. In one example, operating control system 114 is configured as an on-board diagnostics (OBD) system. Operating control system 114 is in communication with locomotive controller 12, for example through wireless communication 122. Operating crew can input data such as instructions, preferences, predefined operational limits, over-riding details, etc. specific to a train mission, or trip, while on-board the locomotive via control system 114 and connected display 116. Display 116 is configured to display an operator interface (as shown in FIG. 3) to the operating crew on-board the locomotive. Based on the mode of operation of operating control system 114, settings of the interface displayed on display 116 may change, as elaborated in FIG. 3. Trip details, locomotive settings and configurations, etc., generated by controller 12 are also displayed to the operating crew on the interface of display 116.

As such, the operating control system for each rail vehicle (herein, each locomotive) is a primary or core control system of the rail vehicle for controlling at least vehicle propulsion and an operator interface, and typically plural additional functions such as communications, data monitoring and recording, safety control, and the like. In one embodiment, the operating control system 114 (e.g., mode of operation of the operating control system) for each of the plurality of locomotives is configured (for example, pre-loaded) with software including settings specific for the entity owning the locomotive. These may include, for example, selections for display settings (e.g., whether locomotive parameters such as temperature, distance, speed, etc., are displayed in metric units, such as kilometers, degrees Celsius, kilometers per hour, or displayed in English units, such as miles, degrees Fahrenheit, miles per hour, etc.). Other examples include selections for AESS settings (more aggressive or less aggressive), work zone settings (that is, rules imposed on a locomotive when approaching a work zone), etc. In one example, the software may be organized as a plurality of software modules, each module including a configurable list of features. Based on the entity owning the locomotive, one or more features from the list of features may be switched on or off to enable or disable those features. As such, different operating control systems, and different modes of each operating control system may have a distinct set of features that are enabled or disabled.

Thus, when all the locomotives of train system 100 are owned and operated by a common entity, they may all have compatible operating control systems (for example, same mode of the operating control system). However, sometimes, a railroad company (or other business entity) may borrow one or more locomotives from another railroad company (or another business entity), wherein the borrowed locomotive is configured with a control system configured according to the lending railroad company. If the control system of the borrowed locomotive is different from, and incompatible with, the control system of the borrowing company, the borrowed locomotive may be deemed functionally incompatible with the other locomotives of the train consist, and relegated to a remote locomotive status. As such, if the borrowed locomotive is newer than the other locomotives of the train consist, it may have various features (such as fuel economy, emissions reduction, and performance enhancing features) that are not available on the other older locomotives of the train consist. Thus, it would be advantageous to operate the borrowed locomotive as the lead locomotive to avail those novel features.

In the depicted example, the locomotives of train system 100 are owned by different entities (such as, different railroad companies or other business entities). Specifically, first locomotive 102 is owned by a first entity (such as a first railroad company) while second locomotive 104 and third locomotive 106 are owned by a second entity. Further, in the depicted example, train system 100 is operated by the second entity (such as a second railroad company). That is, the second entity has borrowed the first locomotive from the first entity. Thus, the first entity is the lending entity while the second entity is the borrowing entity. Locomotive controller 12 may accordingly receive a control signal indicating that the first locomotive is intended for temporary use with the second locomotive.

The operating control system 114 of first locomotive 102 may have a first mode and a second, different mode of operation. The first mode may include settings configured for the first entity (that is, the entity owning and lending out the locomotive), while the second mode may include settings configured for the second entity (that is, the entity borrowing the locomotive). The first mode of the operating control system of the first locomotive may be enabled, while the second mode of the operating control system is disabled, when the first locomotive is operated by the first (owning) entity. In comparison, when the first locomotive is borrowed and operated by the second entity (as depicted herein), the second mode of the operating control system of the first locomotive may be enabled while disabling the first mode of the operating control system, so that the first locomotive is now functionally compatible (with regards to control system) with the second and other locomotives of the train system.

The reconfiguration, elaborated in FIG. 2, may be carried out by locomotive controller 12 in response to a control signal (e.g., a request) indicating that the first locomotive is to be temporarily operated by the second entity according to the second mode of the operating control system. In one embodiment, "temporarily" means that the first mode of the operating control system (or a first operating control system) of the first locomotive is disabled so long as the first locomotive is used by the second entity in a consist with the second locomotive, and also that the first mode of the operating control system (or first operating control system) is deactivated from controlling the first locomotive, but the control logic is not removed from the first locomotive. The reconfiguration can be done wirelessly, for example, through wireless communication 122, wherein software corresponding to the selected control system is wirelessly downloaded onto the borrowed locomotive. Alternatively, if the software is pre-loaded, the reconfiguration is achieved by switching the operating mode of the software from the first mode with settings corresponding to the first entity to the second mode with settings corresponding to the second entity. As elaborated in FIG. 3, reconfiguring the operating mode of the locomotive's operating control system also includes reconfiguring the interface displayed on display 116 of the locomotive. Following the reconfiguration, the first locomotive or other rail vehicle can be controlled with the second mode of the operating control system (or a second operating control system, corresponding to the second borrowing entity), for example, to move the first rail vehicle along a track network. By reconfiguring the first locomotive owned by the first entity to operate compatibly with the second locomotive owned by the second entity, the first locomotive may be used as a lead locomotive while the second locomotive may be used as a remote locomotive.

Now turning to FIG. 2, an example routine 200 is shown for reconfiguring a rail vehicle (e.g., locomotive) owned by a first entity (such as a first railroad company or a first business entity that leases rolling stock) for temporary use with another rail vehicle (e.g., locomotive) owned and operated by a second entity (such as a second railroad company or a second business entity that leases rolling stock), so that all the rail vehicles may be used compatibly. It will be appreciated that while example routine 200 is described using a locomotive as a specific example of a rail vehicle, this is not meant to be limiting, and that in alternate embodiments of the routine, any appropriate rail vehicle may be used.

At 202, the routine includes receiving mission details. These include, but are not limited to, the planned travel route, scheduled stops (location, duration of stop, etc), origin and destination details (ambient temperature, weather, time zone, distance, etc.), weather conditions along the planned route, etc. At 204, train details are received. These include, for example, details regarding the train's configuration and make-up, number and position of cars, identity of the entity operating the train consist, number, position, and status (lead, remote, etc.) of each locomotive in the train consist, make and model of each locomotive, operating control systems (and modes thereof) available on each locomotive, features (trip optimization software, locomotive camera, fuel savings software, power management software, consist management software, AESS software, other novel features), etc. In one embodiment, the operating control system for each rail vehicle (herein, each locomotive) in the rail vehicle consist (herein, train consist) is a primary or core control system of the rail vehicle for controlling at least vehicle propulsion and an operator interface, as well as additional (auxiliary) functions such as communications, data monitoring and recording, safety control, and the like. At 206, operator inputs are received. These include, for example, cost functions and constraints for the different locomotives, additional limits and constraints that may be imposed based on the planned travel route, the destination, the stops, etc. In one example, the constraints and limits may be stored in a look-up table and accessed based on the mission details received at 202 and the train details received at 204. Additionally or optionally, cost functions and limits may be directly input to a controller by an operator, such as via an interface on a locomotive display.

At 208, it may be determined whether the train, as configured, includes any borrowed locomotive(s). If none of the locomotives of the train consist are borrowed, then at 210, the locomotives may be operated according to the selected operating control system, that is, the control system of the entity owning and operating the locomotives of the train consist. If one or more borrowed locomotives are present in the train consist, then at 212, it may be determined whether the borrowed locomotive has an operating control system that is functionally incompatible with the operating control system of the other locomotives of the train consist. If there is no control system incompatibility between the locomotives, then the routine may return to 210 and the locomotives may be operated according to a selected, compatible, common operating control system. For example, the borrowed locomotive may be owned by a first entity and operated according to a first operating control system. The other locomotives of the train consist may be owned and operated by a second, different entity. However, both the first and second entities may operate their locomotives according to the first operating control system. Thus, even though the owning entities are different, the locomotives may have a common, compatible operating control system, according to which the locomotives may be operated when in a train consist.

In comparison, if the borrowed locomotive has control system incompatibility, then at 214, it may be determined if operating control system reconfiguration is requested. In one example, operating control system reconfiguration may be requested when the borrowed locomotive is to be used as a lead locomotive. As such, when the borrowed locomotive is a newer locomotive and/or has additional features that are not available on the remaining locomotives of the train consist, it may be advantageous to use the borrowed locomotive as a lead locomotive and avail of these features. Such features may include, for example, software that enables trip optimization, software that enables consist management, locomotive camera equipment, and other features that improve locomotive emissions, fuel economy, ease of use, and overall locomotive performance. Thus, if control system reconfiguration is not requested, then at 216, the borrowed locomotive with the incompatible operating control system may be relegated to a remote locomotive status. In comparison, if control system reconfiguration is requested, then at 218, the locomotive controller may temporarily disable the original control system of the borrowed locomotive, while at 220, the controller may temporarily reconfigure the operating control system of the borrowed locomotive to operate according to the operating control system (or mode thereof) of the borrowing company. For example, the temporary reconfiguration may mean that the original operating control system of the borrowed locomotive (or other rail vehicle) is disabled so long as the borrowed locomotive is used by the borrowing company in a consist with other rail vehicles, and also that the original operating control system is deactivated from controlling the borrowed locomotive, but not removed from the borrowed locomotive. At 222, an operator control interface of the borrowed locomotive may be adjusted based on the reconfiguration, as elaborated in FIG. 3. Following reconfiguration, at 224, the borrowed locomotive may be assigned as a lead locomotive, if so desired.

At 226, following the reconfiguration (if reconfiguration was requested), or following relegation to a remote locomotive status (if reconfiguration was not requested), the locomotives of the train consist may be operated according to the selected operating control system. At 228, using a selected revenue model, as elaborated in FIG. 4, the controller may determine the cost for temporarily operating the borrowed locomotive, and charge a rental fee to the borrowing company based on the reconfiguration.

For, the train consist may include a first locomotive owned by a first entity and operated according to a first mode of a locomotive operating control system, and a second locomotive owned by a second, different entity and operated according to a second, different mode of the locomotive operating control system. That is, the first locomotive may be a borrowed locomotive. The controller may request reconfiguration of the first locomotive in response to an indication that the first locomotive is intended for temporary use with the second locomotive. In response to the request for reconfiguration, the locomotive controller may temporarily disable the first mode of the operating control system on the first locomotive while temporarily enabling the second mode of the operating control system on the first locomotive. The controller may then operate the first and second locomotive according to the selected second mode of the operating control system.

The first mode of the operating control system may include a first group of settings for operating the first locomotive (or a first rail vehicle), and the second mode of the operating control system may include a second, different group of settings for operating the second locomotive (or second rail vehicle). In another example, the different modes of the operating control system may include different modes of a trip optimization software. Thus, configuring the first locomotive for operation according to the second operating control system mode may include operating the first locomotive with the second group of settings.

In one example, software corresponding to the second mode of the operating control system is wirelessly downloaded onto the first locomotive just before initiating the reconfiguration. In another example, software corresponding to the first and second modes of the operating control system is pre-loaded on the locomotive, and reconfiguration is achieved by changing the mode from the first mode (corresponding to the first entity) to the second mode (corresponding to the second entity). The reconfiguration further includes switching the operator interface of the first locomotive from a first configuration according to the first mode to a second (different) configuration according to the second mode. Following reconfiguration, the first locomotive may be assigned as a lead locomotive while the second locomotive can be assigned as a remote locomotive. Both the locomotives can then be operated according to the second mode of the operating control system. That is, the first mode of the operating control system on the first locomotive may be temporarily disabled while both the first and second locomotive are temporarily controlled using the second mode of the operating control system, for example, to move the first and second locomotives in a train consist along a track network. The controller may then estimate a rental cost for the temporary usage of the first locomotive by the borrowing entity (herein, second entity) based on whether the first locomotive was operated according to the second mode and further based on an amount of usage of the first locomotive in the second mode (e.g., duration of usage, distance covered during usage, etc.). It will be appreciated that while the example illustrates the concept of locomotive reconfiguration using a first and a second mode of an operating control system, this is not meant in a limiting sense, and that in alternate examples, the reconfiguration may be from a first operating control system to a second operating control system.

Now turning to FIG. 3, example embodiments 300, 350 of an interface displayed to a rail vehicle operator on a display 116 coupled to a rail vehicle's (e.g., locomotive's) operating control system are shown. The different embodiments of the interface in a rail vehicle may be enabled based on the selected mode of the rail vehicle's operating control system. For example, when a first mode of a rail vehicle's (e.g., locomotive's) operating control system is enabled, a first configuration of the operator interface (herein first embodiment 300) may be enabled. Similarly, when a second mode of the rail vehicle's (e.g., locomotive's) operating control system is enabled, a second configuration of the operator interface (herein second embodiment 350) may be enabled. As such, based on the selected mode, settings, rules, limits, etc., applied to the rail vehicle, and displayed on the display interface, may change.

First embodiment 300 shows an interface used when the first mode of the operating control system is enabled. The first mode may include a first set of settings selected for a first entity, herein Railroad company 1. For example, when the first mode is enabled, the first embodiment 300 of the interface displays the date of the train mission in the MM/DD/YYYY format. Additional rail vehicle operating data are provided in English units. For example, as depicted, the distance to the destination as well the distance of each scheduled stop from the place of origin is displayed in miles, the temperature at the destination is displayed in degrees Fahrenheit, and the average speed is displayed in miles per hour (mph). In addition to including settings for units of display, the first mode includes settings for operating parameters, such as AESS settings. Thus, when travelling from the selected origin ABC to the selected destination DEF with the first mode enabled, the AESS settings may be adjusted to be less aggressive (herein set at a lower level 4). The less aggressive AESS settings may include restarting the rail vehicle's engine from a shutdown condition at relatively higher temperature thresholds (that is, restarting the engine less often at colder temperatures). The first mode also includes a first set of specific limits. For example, as depicted, the maximum engine power available is set at 4400 hp. Based on the maximum power setting, speed and performance available at the different notch settings may be recalibrated. The first mode also includes a first set of specific rules (such as work zone rules). For example, rail vehicle speeds may be reduced to 5 mph when travelling through a work zone.

Second embodiment 350 shows an interface used when the second mode of the operating control system is enabled. The second mode may include a second set of settings selected for a second entity, herein Railroad company 2. For example, when the second mode is enabled, the second embodiment 350 of the interface displays the date of the train mission in the DD/MM/YYYY format. Additional rail vehicle operating data are provided in metric units. For example, as depicted, the distance to the destination as well the distance of each scheduled stop from the place of origin is displayed in kilometers, the temperature at the destination is displayed in degrees Celsius, and the average speed is displayed in kilometers per hour (kmph). The second mode also includes different settings for rail vehicle operating parameters, such as AESS settings. Thus, when travelling from the selected origin ABC to the selected destination DEF with the second mode enabled, the AESS settings for the rail vehicle may be adjusted to be more aggressive (herein set at a higher level 2). The more aggressive AESS settings may include restarting the rail vehicle's engine from a shutdown condition at relatively lower temperature thresholds (that is, restarting the engine more often at colder temperatures). The second mode further includes a second set of specific limits. For example, as depicted, the maximum engine power available is set at 4000 hp. As such, by adjusting the maximum power setting, the speed and performance available at the different notch settings are also recalibrated. The second mode also includes a second set of specific rules (such as work zone rules). For example, when the second mode is enabled, the rail vehicle may be stopped at 2 km from the designated work zone, and the locomotive may be started only upon receiving confirmation from the work zone.

In this way, by adjusting the operating control system of a rail vehicle based on the identity of entity operating the rail vehicle, all rail vehicles (e.g., locomotives) of a rail vehicle consist (e.g., train consist), or a given fleet, operated by the entity may be made consistent. By improving fleet consistency, rail vehicle operations are made more user-friendly, thereby reducing operator errors.

Now turning to FIG. 4, a routine 400 is depicted for determining the cost for the temporary use of a rail vehicle by an entity differing from the entity that owns the rail vehicle. As elaborated herein, the cost of the locomotive rental may be determined based on the actual or anticipated usage of the borrowed locomotive. A locomotive controller is configured to determine the cost based on the revenue model selected. While the depicted routine illustrates this concept with the use of two revenue models, it will be appreciated that this is not meant in a non-limiting sense, and that any number of revenue models may be alternately provided.

At 402, train details are received. These include, for example, details regarding the train's configuration and make-up, identity of the entity operating the train consist, number, position, and status of each locomotive in the train consist (lead, remote, etc.), make and model of each locomotive, operating control systems (and modes thereof) available on each locomotive, features (trip optimization software, locomotive camera, consist management software, AESS software, other novel features, etc.) available on each locomotive, estimated usage of each locomotive (duration, distance), etc.

At 404, it may be determined whether any of the locomotives of the train consist are borrowed, that is, belong to a different entity. In one example, the train consist may include a first rail vehicle, or locomotive, owned or controlled by a first entity (e.g., a first railroad company or a first business entity leasing rolling stock) according to a first operating control system, and a second rail vehicle, or locomotive, owned or controlled by a second entity (e.g., a first railroad company or a first business entity leasing rolling stock) according to a second operating control system. A controller may determine that one of the locomotives of the train consist is borrowed in response to a control signal indicating that the first rail vehicle is intended for temporary use with the second rail vehicle by the second entity. If no borrowed locomotives are determined, the routine may end. However, if confirmed, then at 406, a revenue model may be selected to determine the cost for the temporary use of the borrowed locomotive. As a non-limiting example, the controller selects from two available revenue models. However, it will be appreciated that additional revenue models may be available. An operator may provide an indication as to which revenue model to use by interacting with the controller through an operator display interface on the locomotive. Alternatively, revenue model preferences for each operating entity may be stored in a look-up table in the controller's memory.

At 408, it may be determined whether revenue model 1 is selected. If yes, then at 412, it may be determined whether the customer wants to reconfigure the borrowed locomotive. In one example, the customer may want to reconfigure the borrowed locomotive so as to be able to use it compatibly as a lead locomotive. As such, if the borrowed locomotive is a newer locomotive with various novel features not available on the remaining locomotives of the train consist, or on other locomotives in the borrowing entity's fleet, then the borrowed locomotive may be advantageously used as a lead locomotive to avail those novel features. Thus, the controller may determine whether the first locomotive borrowed from the first entity is to be configured according to the second operating control system of the second entity. If yes, then at 414, the customer is charged a higher rate to configure the first locomotive for operation according to the second operating control system. In one example, the higher rate is estimated based on the anticipated usage of the first locomotive (duration, distance, etc.) according to the second control system. At 416, reconfiguration of the first locomotive is enabled, for example, following payment of the higher locomotive rental cost. In comparison, if the customer does not want to reconfigure the borrowed locomotive, at 416, when the first locomotive is not operated according to the second control system but operated according to the first (original) operating control system, the customer is charged a lower rate. At 420, reconfiguration of the first locomotive is disabled, for example, following payment of the lower locomotive rental cost.

If revenue model 1 is not selected at 408, then at 410, it may be confirmed whether revenue model 2 is selected. If yes, then at 422, the actual customer usage of the borrowed locomotive is determined. This includes determining the actual duration of travel and/or distance of travel over which the borrowed first locomotive was operated by the second entity, and which operating control system (or mode thereof) was used on the borrowed locomotive. At 424, it may be determined whether the customer had reconfigured the operating control system of the borrowed locomotive. That is, it may be determined whether the first locomotive was used according to the second operating control system. If yes, then at 426, the customer is charged a higher rate for using the first locomotive according to the second operating control system. The cost may be adjusted based on the amount of usage of the first locomotive with the second operating control system. Alternatively, at 428, the customer is charged a lower rate for not using the locomotive according the second operating control system. In this way, by adjusting the cost of usage of a borrowed locomotive based on the operating mode of the locomotive's operating control system, and further based on the amount of usage of the borrowed locomotive, management of locomotive rentals is facilitated.

In one example, a first locomotive owned and operated by a first entity according to a first operating control system may be temporarily borrowed by a second entity for use with a second locomotive according to a second operating control system. For example, the second entity may wish to use the first locomotive as a lead locomotive in a train consist including the second locomotive. To enable compatible use, a controller may reconfigure the first locomotive so that the first operating control system is temporarily deactivated while the second operating control system is activated on the first locomotive. The controller may then determine a cost for the temporary use of the first locomotive (for example, in advance knowing that the first locomotive is to be controlled by the second operating control system, or later, following temporary use of the first locomotive according to the second operating control system). As such, a higher usage rate may be determined for the temporary use of the first locomotive according to the second operating control system. The higher rate may then be charged by the first (lending) entity to the second (borrowing) entity.

In another example, the first locomotive owned and operated by the first entity according to the first operating control system may be temporarily borrowed by a third entity for use with a third locomotive according to the first operating control system. For example, the third entity may wish to use the first locomotive as a remote locomotive in a train consist including the third locomotive. Herein, to enable compatible use, a controller may not need to reconfigure the first locomotive, and so the first operating control system may be remain activated on the first locomotive. The controller may then determine a cost for the temporary use of the first locomotive (for example, in advance knowing that the first locomotive is to be controlled by the first operating control system, or later, following temporary use of the first locomotive according to the first operating control system). As such, a lower usage rate may be determined for the temporary use of the first locomotive according to the first (original) operating control system. The lower rate may then be charged by the first (lending) entity to the third (borrowing) entity.

In one example, software including code for determining the cost of the temporary use of a first rail vehicle may be included as a selectable feature in the operating control system of the first rail vehicle. For example, the feature may be included in the second mode of the rail vehicle's operating control system such that it is selected (e.g., automatically selected) along with the reconfiguration in response to the indication that the first rail vehicle is to be temporarily used by the second entity. In another example, the feature may be included in each mode of a rail vehicle's operating control system and may determine (e.g., automatically determine) the duration and distance of operation of the rail vehicle in each mode. The revenue model software may be adjusted such that the cost of temporary use of a rail vehicle is indicated to one or both of the borrowing entity and the lending entity.

In this way, by enabling a borrowed locomotive to be reconfigured so that it can be operated according to the operating control system of the borrowing company, various features on the borrowed locomotive can be advantageously used, fleet consistency may be achieved, and overall performance can be improved.

Unless otherwise specified (such as in the claims), embodiments of the invention are applicable to rail vehicles generally, and/or to vehicles with diesel engines. Thus, any instances of "locomotive" herein refer more generally to a rail vehicle or other vehicle, unless otherwise specified.

The term "lead" rail vehicle as used herein refers to a rail vehicle designated for primary control of a rail vehicle consist, and not necessarily to the first rail vehicle in the consist. However, in some operational modes, the lead rail vehicle may be the first rail vehicle in the rail vehicle consist. "Remote" or "trail" rail vehicle as used herein refers to a rail vehicle set to take a subordinate role in consist control, e.g., a remote or trail rail vehicle controlled based on control signals received from the lead rail vehicle, such as in distributed power operations.

As noted, the respective, different entities owning or otherwise controlling the first and second rail vehicles herein may be railroad companies or other business entities, such as companies that lease rolling stock.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:

1. A method of controlling a rail vehicle carried out by a controller, comprising:
    receiving, at the controller, the controller having memory storing computer readable instructions, a control signal indicating that a first rail vehicle is intended for temporary use with a second rail vehicle, wherein the first rail vehicle is owned or controlled by a first entity and operates according to a first operating control system, and wherein the second rail vehicle is owned or controlled by a second, different entity and operates according to a second, different operating control system;
    based on the received control signal, the controller temporarily disabling the first operating control system on the first rail vehicle, and re-configuring the first rail vehicle for operation according to the second operating control system; and
    controlling, via the controller, the first rail vehicle with the second operating control system, further comprising determining a cost for the temporary use of the first rail vehicle based at least on the re-configuring of the first rail vehicle according to the second operating control system.

2. The method of claim 1, wherein the cost determination for the temporary use of the first rail vehicle includes charging a higher rate when the first rail vehicle is operated according to the second operating control system and charging a lower rate when the first rail vehicle is operated according to the first operating control system.

3. The method of claim 1, wherein the cost determination includes charging a higher rate to configure the first rail vehicle for operation according to the second operating control system and charging a lower rate to configure the first rail vehicle for operation according to the first operating control system.

4. A train system comprising:
    a first locomotive owned by a first entity, the first locomotive including an operating control system having a first mode of operation and a second, different mode of operation, the first mode including settings configured for the first entity, the second mode including settings configured for a second, different entity; and
    a controller of the train system with memory and computer readable instructions for,
        enabling the first mode and disabling the second mode of the operating control system when the first locomotive is operated by the first entity; and
        enabling the second mode and disabling the first mode of the operating control system when the first locomotive is operated by the second entity, the controller receiving signals from one or more sensors, wherein the controller further includes instructions for,
            determining a cost charged to the second entity for the temporary operation of the first locomotive, the cost based on an amount of usage of the first locomotive with the operating control system in the second mode.

5. A system comprising:
    a controller for a rail vehicle owned by a first entity, wherein the controller is configured to receive signals from one or more sensors, and wherein the controller includes a memory and computer readable instructions for:
        enabling a first mode of operation of an operating control system of the rail vehicle and disabling a different, second mode of operation of the operating control system when the rail vehicle is operated by the first entity, the first mode including settings configured for the first entity and the second mode including settings configured for a second, different entity;
        enabling the second mode and disabling the first mode of the operating control system when the rail vehicle is operated by the second entity; and
        determining a cost charged to the second entity for the temporary operation of the rail vehicle, the cost based on an amount of usage of the rail vehicle with the operating control system in the second mode.

* * * * *

UNITED STATES PATENT AND TRADEMARK OFFICE
CERTIFICATE OF CORRECTION

PATENT NO. : 8,843,419 B2  
APPLICATION NO. : 12/902209  
DATED : September 23, 2014  
INVENTOR(S) : Cooper et al.

Page 1 of 1

It is certified that error appears in the above-identified patent and that said Letters Patent is hereby corrected as shown below:

On the Title Page, Item (75), under "Inventors", in Column 1, Line 4, delete "Erie, FL" and insert -- Erie PA, --, therefor.

Signed and Sealed this  
Twenty-second Day of March, 2016

Michelle K. Lee  
*Director of the United States Patent and Trademark Office*